United States Patent
Nieuwendyk et al.

(10) Patent No.: US 10,330,405 B2
(45) Date of Patent: Jun. 25, 2019

(54) COOLANT DISTRIBUTION SYSTEM

(71) Applicant: Flexxaire Inc., Edmonton (CA)

(72) Inventors: Chris Nieuwendyk, Sherwood Park (CA); Jonathan E. McCallum, Edmonton (CA)

(73) Assignee: Flexxaire Inc., Edmonton (CA)

( * ) Notice: Subject to any disclaimer, the term of this patent is extended or adjusted under 35 U.S.C. 154(b) by 100 days.

(21) Appl. No.: 15/598,265

(22) Filed: May 17, 2017

(65) Prior Publication Data

US 2017/0336157 A1     Nov. 23, 2017

Related U.S. Application Data

(60) Provisional application No. 62/337,713, filed on May 17, 2016.

(51) Int. Cl.
| | | |
|---|---|---|
| *F28F 27/02* | (2006.01) | |
| *B23Q 11/12* | (2006.01) | |
| *B01F 13/10* | (2006.01) | |
| *B01F 15/04* | (2006.01) | |
| *B23Q 11/10* | (2006.01) | |

(52) U.S. Cl.
CPC .......... *F28F 27/02* (2013.01); *B01F 13/1019* (2013.01); *B01F 15/0441* (2013.01); *B23Q 11/1061* (2013.01); *B23Q 11/1084* (2013.01); *B23Q 11/126* (2013.01)

(58) Field of Classification Search
CPC ....... F28F 27/02; B01F 13/1019; B01F 15/04; B01F 15/0441; B23Q 11/1061; B23Q 11/1084; B23Q 11/126
See application file for complete search history.

(56) References Cited

U.S. PATENT DOCUMENTS

| | | | | |
|---|---|---|---|---|
| 5,224,051 A | * | 6/1993 | Johnson | G05D 21/02 184/6.14 |
| 6,786,235 B2 | | 9/2004 | Liang | |
| 6,955,171 B1 | | 10/2005 | Figley et al. | |
| 8,720,244 B2 | * | 5/2014 | Takahama | B21B 1/28 72/236 |
| 9,810,211 B2 | * | 11/2017 | Davidian | F04B 43/12 |
| 2002/0139425 A1 | | 10/2002 | Liang | |
| 2010/0282257 A1 | | 11/2010 | Chapman et al. | |
| 2014/0271002 A1 | * | 9/2014 | Hoshino | B23Q 11/10 408/56 |
| 2016/0070274 A1 | * | 3/2016 | Haas | B23Q 11/1061 700/285 |

FOREIGN PATENT DOCUMENTS

| | | | | |
|---|---|---|---|---|
| EP | 1 588 798 | | 10/2005 | |
| JP | 63191547 A | * | 8/1988 | ......... B23Q 11/1038 |

OTHER PUBLICATIONS

Extended European Search Report dated Oct. 18, 2017, in European Patent Application No. 17171092.4, 5 pages.
English abstract of Japan Patent Pub. No. 2009189925, published Aug. 27, 2009, 1 page.

* cited by examiner

*Primary Examiner* — Marc E Norman
(74) *Attorney, Agent, or Firm* — Lowe Graham Jones PLLC

(57) ABSTRACT

A coolant distribution system uses two premixed streams of coolant at either extreme of a concentration range, and mixes these two streams in the correct percentage to obtain the desired concentration. Mixing the two streams follows a pulse width approach, and the system may use a manifold to deliver fluid to multiple machines.

8 Claims, 2 Drawing Sheets

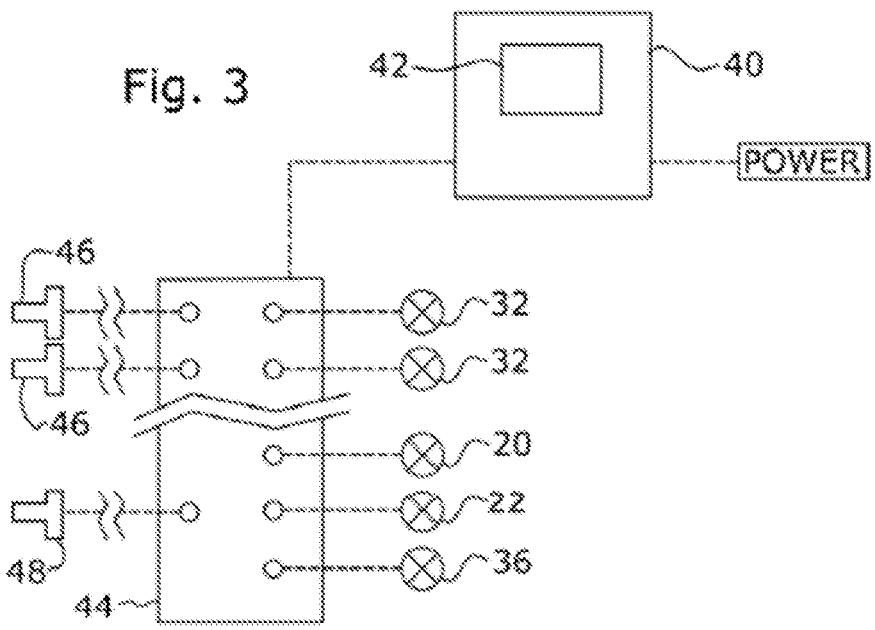

| providing sources of coolant and a diluent | 50 |

| mixing the coolant and diluent to produce a first concentration of coolant and separately mixing the coolant and diluent to produce a second concentration of coolant | 52 |

| mixing the flows using sequential selection of the first concentration and the second concentration to generate pulses of the coolant having modulated pulse volume to provide a flow of a desired concentration of coolant | 54 |

| supplying the flow of a desired concentration of coolant to multiple machines | 56 |

COOLANT DISTRIBUTION SYSTEM

PRIORITY CLAIM

This application claims priority from U.S. Patent Application No. 62/337,713 filed May 17, 2016, which application is incorporated herein by reference in its entirety.

FIELD OF THE INVENTION

Coolant distribution to machines.

BACKGROUND OF THE INVENTION

Many types of metal working equipment (lathes, mills, saws, cnc maching centers) use coolant to flood the work piece and the cutting tools to extend the life of the cutting tools, remove chips, and keep the machines from rusting. The coolant in a machine is obtained by taking a coolant concentrate and mixing it with water at a percentage that typically ranges from 2-10% coolant to water. The specific concentration is a function of the type of coolant concentrate, and the specific machine requirements.

Typically, the coolant in the machines need to be topped up every 6-8 hours of operation because of evaporation and that some of the coolant gets dragged out with the chips.

Maintaining correct coolant concentration and coolant level in a machine can be essential to part quality (maintaining tolerances and surface finishes) and tool life. This can be a labour intensive process, where buckets of coolant are carried to machines to top them up on a daily basis.

SUMMARY OF THE INVENTION

A coolant distribution system uses two premixed streams of coolant at either extreme of a concentration range, and mixes these two streams in the correct percentage to obtain the desired concentration. Mixing the two streams follows a pulse width approach, in which pulses of the coolant are produced having modulated pulse volume to provide a flow of a desired concentration and the system may use a manifold to deliver fluid to multiple machines. These and other aspects of the device and method are set out in the claims.

BRIEF DESCRIPTION OF THE DRAWINGS

Preferred and alternative examples of the present invention are described in detail below with reference to the following drawings, in which like reference characters denote like elements, by way of example:

FIG. 3 is an electrical schematic for a coolant distribution system.

FIG. 4 is a schematic illustrating steps of a disclosed method of coolant distribution.

DETAILED DESCRIPTION OF THE PREFERRED EMBODIMENT

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The coolant distribution system (Flexxcool™ system) is a system that automatically distributes coolant to a machine to maintain correct coolant concentration and coolant level with no labor.

Figure 2:
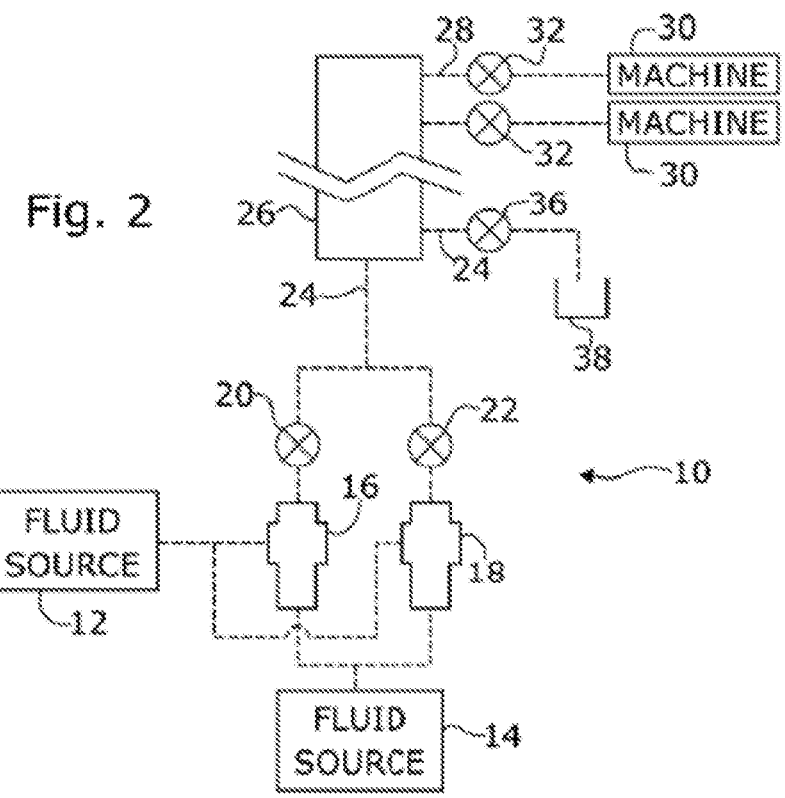
FIG. 2 is a piping schematic for a coolant distribution system.

FIG. 2 shows a coolant distribution system 10 that receives fluid from a first source 12 of fluid and a second source 14 of fluid. Source 12 may be a fresh water feed, 100% water, though it may be a municipal supply, and source 14 may be a commercially available machine coolant. The water functions as a diluent of the coolant. Each source 12, 14 is provided separately to both a first mixing module 16 and a second mixing module 18. Each mixing module 16 and 18 mixes the inputs to produce respective outputs C1 and C2 of set concentration, the concentrations being set at some fixed and different values, for example by a manual setting of the mixing module. Each output C1 and C2 comprises a pulse of fluid having a volume that depends on the size of the channels in the mixing modules and the length of time the outputs are being generated. The outputs from the mixing modules 16 and 18 are then mixed by timed selection of the outputs using a valve arrangement, for example using valve 20 that is connected to receive fluid having a concentration C1 from mixing module 16 and using valve 22 that is connected to receive fluid having a concentration C2 from mixing module 18. Each valve 20 and 22 is opened sequentially for a set time each so that when one is on, the other is off. The on period for each valve is set according to the desired end concentration. The outputs of the valves 20 and 22 are joined at a single line 24 and delivered to a manifold 26. Various lines 28 from the manifold 26 deliver the selected fluid concentration to the various machines 30 needing coolant. Flow in the lines 28 from the manifold 26 to the machines 30 may be controlled by respective valves 32 on the lines 28. A manual fill valve 36 on line 34 from the manifold 26 may be used to control flow on the line 34 and deliver fluid to a bucket 38 for manual delivery of fluid.

As shown in FIG. 3, a Programmable Logic Controller 40 (PLC) with human machine interface 42 controls operation of valves 20, 22 and 32 through an input-output module 44 via conventional wired or wireless connections illustrated by the lines in the figure that extend between the modules and valves. The PLC 40 receives signals from sensors 46 along conventional wired or wireless connections through the I/O module 44 and is configured (programmed or via hardware) to selectively control flow in the valves 32 and supply coolant to the multiple machines 32 in response to receiving signals from the fluid level sensors 46 that are indicative of fluid levels at the multiple machines 32. The sensors 46 are conventional fluid level sensors, each associated with a respective one of the machines 30. The PLC 40 may also control flow to the manual fill valve 36.

The coolant level sensors 46 may be ultrasonic sensors are installed on each machine to determine the coolant levels at each machine.

The Coolant Mixing valves 16 and 18 may be two coolant mixing valves set at the two extremes of concentration that could be requested (for instance 1% and 10%). The coolant concentrate is drawn directly from the concentrate tank 14 and is automatically mixed at the precise percentage when water is flowing through the valves 20 and 22.

The valve manifold 26 selects which source of coolant to use, and also controls which machine 30 is being filled.

The PLC 40 is an electronic processor based control that monitors all the machines 30 and turns the valves 32 on the valve manifold 26 on and off.

A challenge is how to adjust the coolant concentration accurately and repeatedly. Coolant needs to be well mixed prior to putting it into a machine 30 (that is, it is not acceptable to dilute the concentration of coolant with pure water in the machine 30 as the diluted coolant may not be mixed well and may lead to rusting a machine). As well, the coolant mixing valves 16, 18 do not allow for automated adjustment. An embodiment of the proposed coolant distribution system 10 uses two premixed streams of coolant at either extreme of a range of concentration, and to mix these two streams in the correct percentage to obtain the desired concentration.

The desired degree of mixing is achieved by calculating a duty cycle for a pwm (pulse width modulation) signal to the valve 20 and to the valve 22 and adjusting the pwm duty cycle as follows:

C1=Concentration of mixing valve 20
C2=Concentration of mixing valve 22
CM=Desired concentration for a respective machine 30.
PWMF=Total cycle time of pwm signal
TV1=On time for Valve 20
TV2=On time for Valve 22

$$TV1=PWM*(C2-CM)/(C2-C1)$$

$$TV2=PWM*(CM-C1)/(C2-C1) \text{copy}$$

Figure 1:
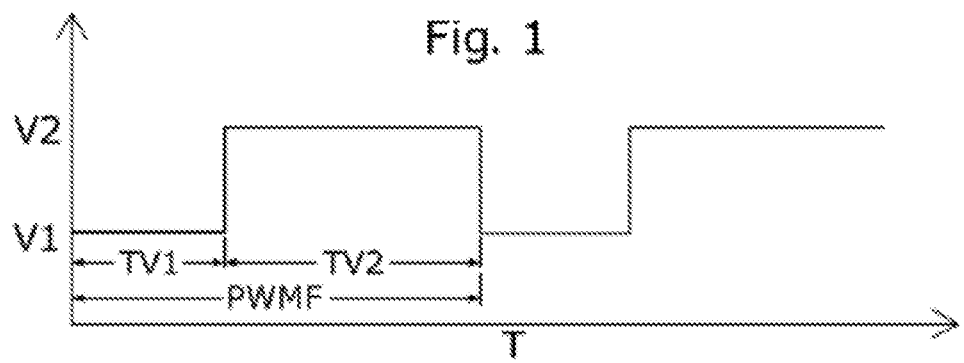
FIG. 1 is a graph showing on and off times for valves in a coolant distribution system.

In FIG. 1, V1 is valve 20 and V2 is valve 22 in the above description.

This mixing system allows for very precise and repeatable control of the concentrations because each mixing module 16 and 18 can be adjusted and calibrated to produce the specific concentration, and then can be locked to that one concentration. The mixing is controlled by accurately controlling the timing of the valves 20 and 22 which can be done very accurately very easily. And by using two different concentrations of coolant, the problem of pure water as a diluter is eliminated.

Instead of trying to get to a specific concentration in one step, the coolant distribution system first generates two streams of coolant at known concentrations, then mixes them with each other to arrive at the desired concentration.

Thus, as disclosed in FIG. 4, in a method of distributing coolant, sources of a coolant and diluent are provided (step 50) and flows from them are mixed to provide flows of a first concentration of coolant and a second concentration of coolant (step 52), and the flows are mixed in a pwm modulate manner (step 54) to provide a flow of a desired concentration of coolant, which may be provided to multiple machines (step 56) for example through a manifold.

Additional Features that may or may not be used depending on the application:

Manual fill feature with timer: To fill a bucket 38 with coolant, an extra valve 34 and special page on the PLC interface 42 may be used to allow selection of the desired concentration and fill time so that with a simple press of a button the bucket 38 may be filled with the precise concentration of coolant.

A sensor 48 may be provided on the coolant tank 14 to provide a signal to the PLC 40 to indicate when the coolant tank is low.

Distributed communication may be provided between valve manifold 28 and PLC 40 over TCPIP (Ethernet cable or WiFi) that allows one PLC 40 to control multiple valve manifolds 28.

A data logging function in the PLC 40 may be used to indicate how much coolant each machine 30 uses.

Email communication: The PLC 40 may email various messages: For instance when the coolant is low, the PLC 40 can be configured to send an email indicating it is time to order more coolant.

Specifications:

Valves 20, 22, 32 and 34: A commercially available valve rated for coolant may be used. An air over electric valve may be used. The air/electric valve allows use of low current coils. The PLC 40 turns on a small air valve, and the air pressure shifts the larger coolant valve. These are all integrated into an off the shelf valve.

PLC 40: A Siemens PLC with an HMI (Human Machine Interface) for example a touch screen display may be used.

I/O Module 44: the PLC 40 talks to an I/O (input/Output) module that is mounted on the valve manifold 26 for example using an Ethernet cable. Module 44 drives the valves 20, 22, 32 and 36 as well as reads the level sensors 46.

Level sensors 46 may use an ultrasonic sensor, in series with a wet floor sensor (switch). If there is a miss read on the sensor 46 and the coolant level gets too high, it will trip the wet floor sensor before it spills.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A coolant delivery system, comprising:
    a first mixing valve connected to a source of a first fluid and a source of a second fluid and having a first output of a first concentration of the first fluid and the second fluid;
    a second mixing valve connected to the source of the first fluid and the source of the second fluid and having a second output of a second concentration of the first fluid and the second fluid, the first concentration being different from the second concentration; and
    a valve arrangement connected to receive the first output and the second output and selectively deliver the first output or the second output to a manifold, the valve arrangement being operable under control of a controller to select one of the first output and the second output sequentially to produce a desired concentration of the first fluid and the second fluid in the manifold.

2. The coolant distribution system of claim 1 in which the manifold is connected to supply coolant to multiple machines.

3. The coolant distribution system of claim 2 in which each machine of the multiple machines is associated with a fluid level sensor and the controller is configured to selectively supply coolant to the multiple machines in response to receiving signals from the fluid level sensors that are indicative of fluid levels at the multiple machines.

4. The coolant distribution system of claim 2 in which the controller is configured to selectively supply coolant to the multiple machines in response to receiving signals indicative of fluid levels at the multiple machines.

5. The coolant distribution system of claim 4 in which the first fluid comprises a coolant and the second fluid comprises a diluent.

6. The coolant distribution system of claim 2 in which the first fluid comprises a coolant and the second fluid comprises a diluent.

7. The coolant distribution system of claim 6 in which the plural machines comprise a metal working machine.

8. The coolant distribution system of claim 2 in which the plural machines comprise a metal working machine.

\* \* \* \* \*